United States Patent
Geiger

(10) Patent No.: US 6,181,348 B1
(45) Date of Patent: Jan. 30, 2001

(54) METHOD FOR SELECTIVE VOLUME VISUALIZATION VIA TEXTURE MAPPING

(75) Inventor: Bernhard Geiger, Plainsboro, NJ (US)

(73) Assignee: Siemens Corporate Research, Inc., Princeton, NJ (US)

( * ) Notice: Under 35 U.S.C. 154(b), the term of this patent shall be extended for 0 days.

(21) Appl. No.: 08/935,229

(22) Filed: Sep. 22, 1997

(51) Int. Cl.⁷ .................................................. G06T 11/40
(52) U.S. Cl. ......................... 345/430; 345/423; 345/424; 345/425
(58) Field of Search .................... 345/430, 429, 345/424, 423, 425

(56) References Cited

U.S. PATENT DOCUMENTS

| | | | |
|---|---|---|---|
| 4,719,585 | * | 1/1988 | Cline et al. ........................... 345/424 |
| 4,879,668 | * | 11/1989 | Cline et al. ........................... 345/424 |
| 5,313,567 | * | 5/1994 | Civanlar et al. ...................... 345/424 |
| 5,412,563 | * | 5/1995 | Cline et al. . |
| 5,734,384 | * | 3/1998 | Yanof et al. ......................... 345/424 |
| 5,742,293 | * | 4/1998 | Koyamada et al. ................. 345/421 |
| 5,782,762 | * | 7/1998 | Vining ................................. 600/407 |
| 5,793,375 | * | 8/1998 | Tanaka ................................ 345/426 |
| 5,844,567 | * | 12/1998 | Gossett et al. ...................... 345/430 |
| 5,859,891 | * | 1/1999 | Hibbard ............................... 378/62 |
| 5,877,779 | * | 3/1999 | Goldberg et al. ................... 345/511 |
| 5,956,041 | * | 9/1999 | Koyamada et al. ................. 345/420 |

* cited by examiner

Primary Examiner—Mark R. Powell
Assistant Examiner—Motilewa Good-Johnson
(74) Attorney, Agent, or Firm—Donald B. Paschburg

(57) ABSTRACT

A method for rendering volume data as texture maps on top of polyhedral surfaces is provided. Initially, a region of interest (roi) to be rendered must be selected. The selection of a region of interest is done using simple segmentation. The polyhedral surface of this segmentation is used to sample the volume data at a specified depth. The result of the sampling is converted into texture maps that are rendered on the segmented surface.

20 Claims, 7 Drawing Sheets

METHOD FOR SELECTIVE VOLUME VISUALIZATION VIA TEXTURE MAPPING

BACKGROUND OF THE INVENTION

1. Field of the Invention

The invention relates to volume rendering. More particularly, it relates to a method for rendering volume data as texture maps on top of polyhedral surfaces.

2. Prior Art

Visualization of large volumetric datasets frequently requires the selection of subsets in order to discard unnecessary or obstructing information. Volume rendering offers two ways of selecting: one is to choose the opacity mapping functions appropriately, and the other is to use clipping planes. These two methods, however, are not always sufficient. For example, if the region of interest (ROI) to be rendered is embedded inside data of similar features, and its shape is not convex, it cannot easily be isolated by using clipping planes.

Surface shaded display (SSD) or surface shaded volume rendering are other methods that are used for volume rendering. SSD generally requires 3D texture acceleration hardware that is only available on very expensive machines.

Another alternative for image evaluation is segmentation. Segmentation is a division of the complex picture into parts corresponding to regions or object. For data sets that have a low signal to noise ratio, or for embedded ROIs, segmentation is not always an applicable alternative. Binary segmented surfaces also lack information that is available in the volume dataset.

SUMMARY OF THE INVENTION

A method for rendering volume data as texture maps on top of polyhedral surfaces is provided. Initially, a region of interest (roi) to be rendered must be selected. The selection of a region of interest is done using simple segmentation. The polyhedral surface of this segmentation is used to sample the volume data at a specified depth. The result of the sampling is converted into texture maps that are rendered on the segmented surface.

The present method only uses data close to the surface of the object being rendered, and therefore eliminates concern about distortion generated from resampling. It also enables the selection of various mapping procedures (e.g., maximum intensity projection, minimum intensity projection, etc.) to increase rendering details and show different features depending on the particular application.

In an illustrative embodiment, the method can be used to show structures that are close to a selected surface, enhance a segmented surface, or evaluate the wall thickness of organs (e.g., colon, trachea). It provides more control over the volume to be visualized, and enables the mapping of the volume inside, as well as outside onto the surface. The rendering of an organ wall of an organ which has air inside can also be performed by this method. To do this, the outside of the organ wall/air surface is sampled and then mapped onto the polyhedral surface representation of the same.

Since the texture calculation can be done in a preprocessing step, the rendering is interactive on a graphic platform with 2D texture hardware support. For example, the display, rotation, and translation can be performed in real time when 2D texture acceleration hardware is available.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF PREFERRED EMBODIMENTS

The invention generally relates to diagnostic volume rendering and particular to volume rendering using texture mapping. To facilitate discussion, the invention is described in the context of diagnostic applications. However, the invention is broader and is applicable to all kinds of medical and physical diagnostic and treatment applications.

The selection of a region of interest (roi) to be rendered is performed by simple segmentation. Segmentation has been done in medical workstations using various tools such as, for example, thresholding, region growing, and interactive drawing. Once a region has been selected and segmented, a coarse polyhedral model is generated. Several methods are available for converting binary segmented medical data into polyhedral models. The most commonly used is the Marching Cubes method (See, H. Cline, W. Lorensen, S Ludke, C. Crawford, and B. Teeter, *Two Algorithms for three-dimensional Reconstruction of Tomograms, "In Medical Physics"*, pages 64–71, 1989). Another method for generating polyhedral models is by 3D Delaunay triangulation, which is used in readily available software entitled "NUAGES" (See, J-D, Boissonnat and B. Geiger, *Three Dimensional Reconstruction of Complex Shapes based on the Delaunay Triangulation*. In R. S. Acharya and D. B. Goldgof, editors, *"Biomedical Image Processing and Biomedical Visualization"*, pages 964–975, San Jose Calif., February 1993, SPIE. vol. 1905, part 2). Both methods create a polyhedral model with triangular surfaces. In an illustrative embodiment of the invention, the software NUAGES is utilized since it creates fewer triangles for a more coarse polyhedral model.

For purposes of this discussion, we are only considering polyhedral models with triangular faces (i.e., quadrilaterals can be split into two triangles). For each triangle in 3D-space of the polyhedral surface, we need to calculate a 2D texture map. This is done in three steps: allocation of a 2 dimensional texture image of an appropriate size (FIG. 1.); calculation of several layers of parallel triangles based on Gouraud normals (FIG. 2); and compositing of different layers into the texture image (rasterization of FIG. 3).

Figure 1:
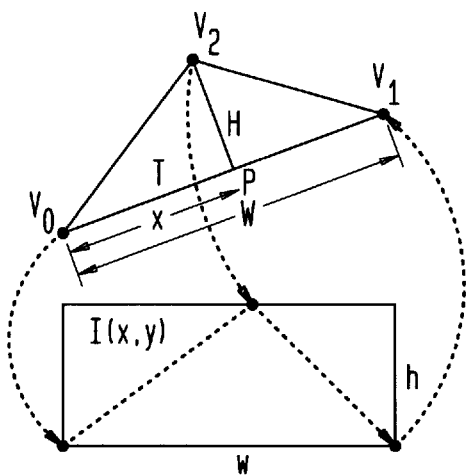
FIG. 1 is graphical representation of the allocation of a texture image for a triangular sample according to an illustrative embodiment of the invention.

FIG. 1 shows the allocation of a texture map according to an illustrative example of the invention. This step assures that we obtain a texture image with appropriate dimensions, and the right correspondence between the texture map and the triangle vertices (texture coordinates). A triangle T is formed from a segmented surface of the region of interest (roi). The vertices of the triangle are depicted $v_0$, $v_1$, and $v_2$, where the largest side is $v_0$, $v_1$, and h is the orthogonal distance from $v_2$ to $v_0$, $v_1$. P represents the orthogonal projection of $v_2$ onto edge $v_0,v_1$. Once the triangle is defined, a texture image I is allocated where the length of $v_0,v_1$ is defined by $W=\|v_0,v_1\|$ and a height H. It is assumed that the coordinates are in voxel space (e.g., one unit corresponds to one voxel in a volume of cubic voxels. However, the sampling can be easily adapted to non-isotropic volume data by multiplication with the scale factors on each direction). The texture image I(x,y) is allocated with a width w=round (W+0.5) and height h=round(H+0.5) pixels. Texture coordinates are defined for each of the vertices as follows:

for vertex $v_0$, $tx_0$=(0,0);

for vertex $v_1$, $tx_1$=(1,0);

for vertex $v_2$, $tx_2$=(x/W, 1)

where x is the distance between $v_0$ and P, and W and H are the exact width and height, respectively of the 3 dimensional triangle.

Figure 2:
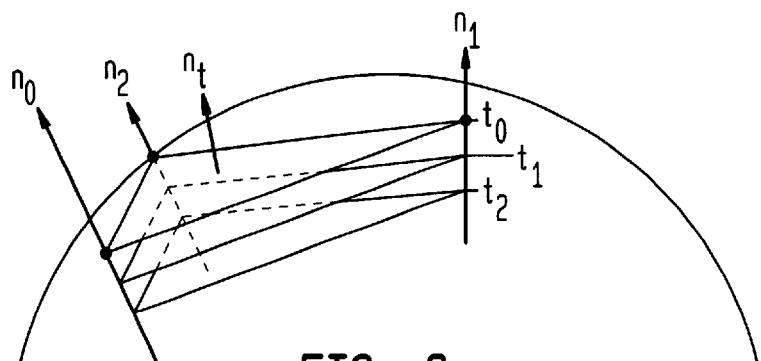
FIG. 2 is a graphical representation of the calculated normals required for Gouraud shading.

Referring to FIG. 2, the coarse polyhedral model consisting of triangles is used as a base to sample the volume data in parallel layers. At each vertex of the initial triangle $t_o$, an interpolated normal is calculated, as required for Gouraud shading (See, Foley, Van Dam, Feiner, Hughes, "*Computer Graphics, Principals and Practice*" Addision Wesley). Given the triangle $t_o$ defined by vertices $v_{oi}$, vertex normals $n_i$, and a normal $n_t$ (i=0 . . . 2). $n_t$ is pointing to the outside of the polyhedra. The use of the software NUAGES performs the generation of the Gouraud normals in addition to the polyhedral model.

Once the texture coordinates $t_{xi}$, Gouraud interpolated normals $n_i$ (i=0 . . . 2), and a normal $n_t$, have been determined, the texture image can be composed where: w is the width of I in pixels; h is the height of I in pixels; a start value is specified; and, a depth and a sampling distance d are provided. Start specifies how many layers of thickness d to skip, and depth specifies how many layers of thickness d to sample. The variation of d will determine whether over sampling or under sampling is performed. For example, when d<1, it will over sample, and when d is >1, it will under sample. The choice for over or under sampling is made based on a quality vs. speed determination. When over sampling (i.e., d<1) the quality is increased, and the speed is decreased, and when under sampling (i.e., d>1) the speed is increased while the quality is decreased. The compose texture image process is then performed. First, the image I is cleared. If minimum intensity projection (MINIP) is used, set image I to high intensity. Then for (j=1; j<depth; j++) parallel triangles $T_j$ are calculated with vertices:

$$v_{ji} = v_{oi} - \frac{(\text{start} - 1 + j)d}{s_i} n_i, \; s_i = n_i \circ n_t (i = 0 \cdots 2).$$

Then, $p_j$ is calculated (i.e., the orthogonal projection of $v_{j2}$ onto edge $v_{j0}$, $v_{j1}$).

Figure 3:
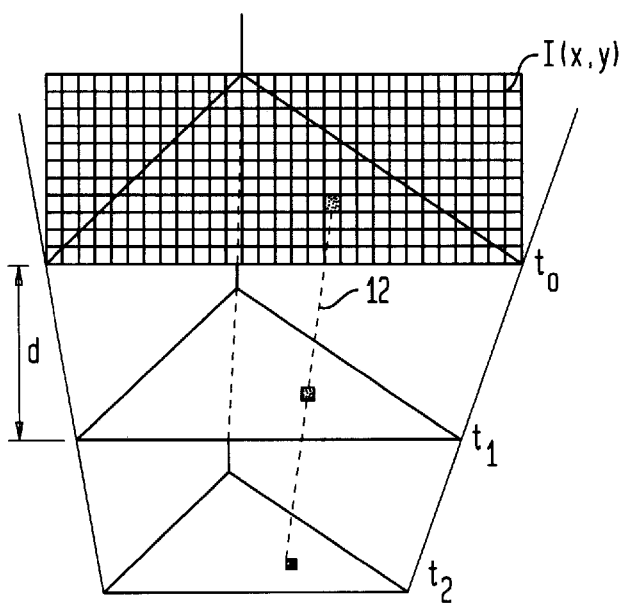
FIG. 3 is a graphical representation of texture mapping of a triangle sample according to an illustrative embodiment of the invention.

FIG. 3 shows the compositing of different layers into the texture image (i.e., rasterization). A texture image I(x,y) that covers the triangle $t_o$ is allocated. The texture image is calculated by resampling the data volume along the triangles $t_j$, with j=start . . . start+depth. Each triangle $t_j$ is sampled along the grid of $t_o$ as shown by dotted line 12. The texture map I is then composed from the sampled layers $t_j$ by using the maximum intensity projection (MIP), or minimum intensity projection (MINIP) or X-ray projection. The value 'start' can be used to skip a layer, and 'depth' adjusts the range of the mapped data. By specifying a negative 'depth', the sampling direction is reversed, and would begin to sample the exterior surface. For each pixel I(x,y) of image I, the following steps are performed:

i. calculate its position on triangle $T_j$ as follows:

$$q = v_{jo} + \frac{x}{w-1}(v_{j1} - v_{j0}) + \frac{y}{h-1}(v_{j2} - p_j),$$

$$x = 0 \cdots w - 1, y = 0 \cdots h - 1$$

ii. calculate intensity i at this position q as a trilinear interpolation from the nearest 8 voxels.

iii. for MIP mapping, if new value i is larger than previous value of pixel, replace with i. Otherwise keep old value.

iv. for minimum intensity mapping, if new value i is smaller than previous value of pixel, replace with i.

v. for X-ray projections, add values.

The rasterization of FIG. 3 will include a stop criterion that stops when the triangle is getting too small. As explained, the depth variable determines the range of sampling and can be used to provide the stop criterion.

In an illustrative embodiment, the resampling step could be done very efficiently using 3D texture mapping, by specifying the vertices $v_{ji}$ as 3D texture coordinates. The use of 3D texture mapping would require additional hardware.

The following FIGS. 4–9 show examples of the results obtained by the illustrative method of the present invention. The implementation of the method was made using IRIS GL. The preprocessing time for calculating the texture maps depends linearly on the surface area and depth. For the examples presented, it was between 10–20 seconds, using unoptimized software for resampling. All textures are showing the MIP of the sampled layers. The rendering speed is dependent on the hardware capabilities, and in these examples was about one frame per second (Irix 6,2, SGI High Impact with 4M texture buffer).

Figure 4:
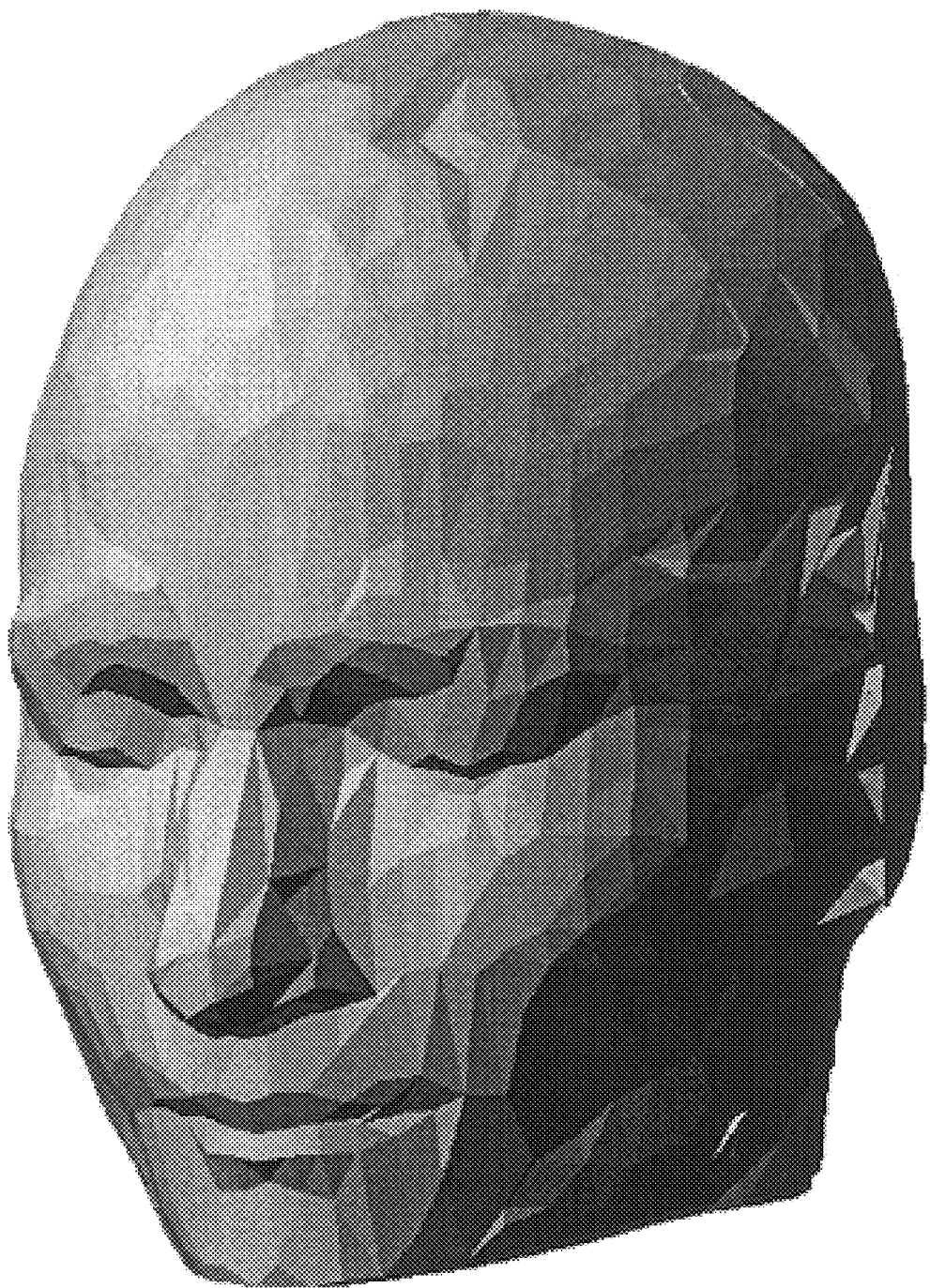
FIG. 4 is an example of the result of a segmentation of the head from a Magnetic Resonance dataset, rendered flat shaded.
Figure 5:
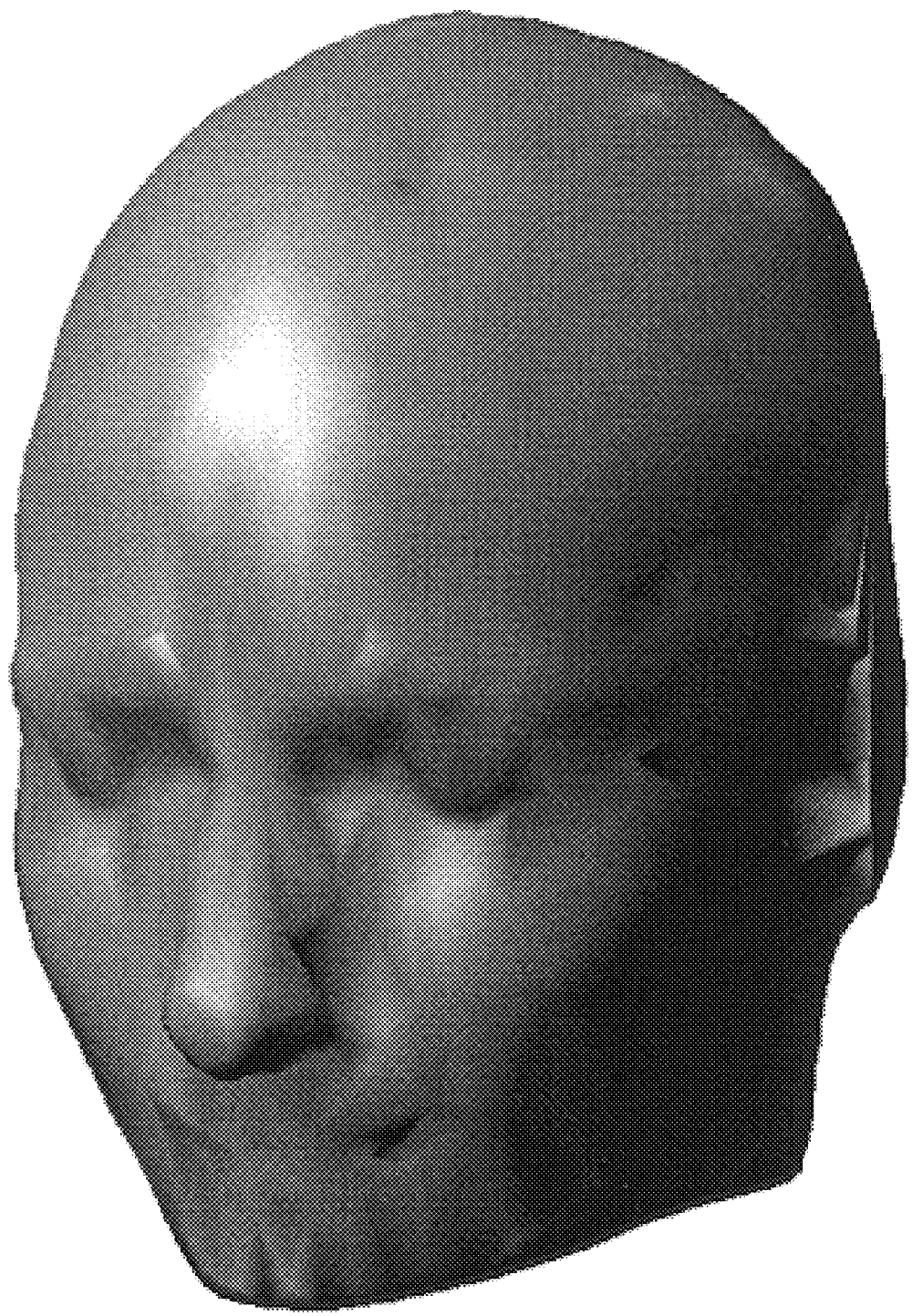
FIG. 5 is an example of a Gouraud shaded rendering of the head of FIG. 3.

FIGS. 4–8 shows the results from a magnetic resonance dataset of the head with a resolution of 256×256×128. FIG. 4 shows the polyhedral surface obtained from thresholding of air, consisting of about 2500 triangles. FIG. 5 shows the Gouraud shaded rendering of the image of FIG. 4.

Figure 6:
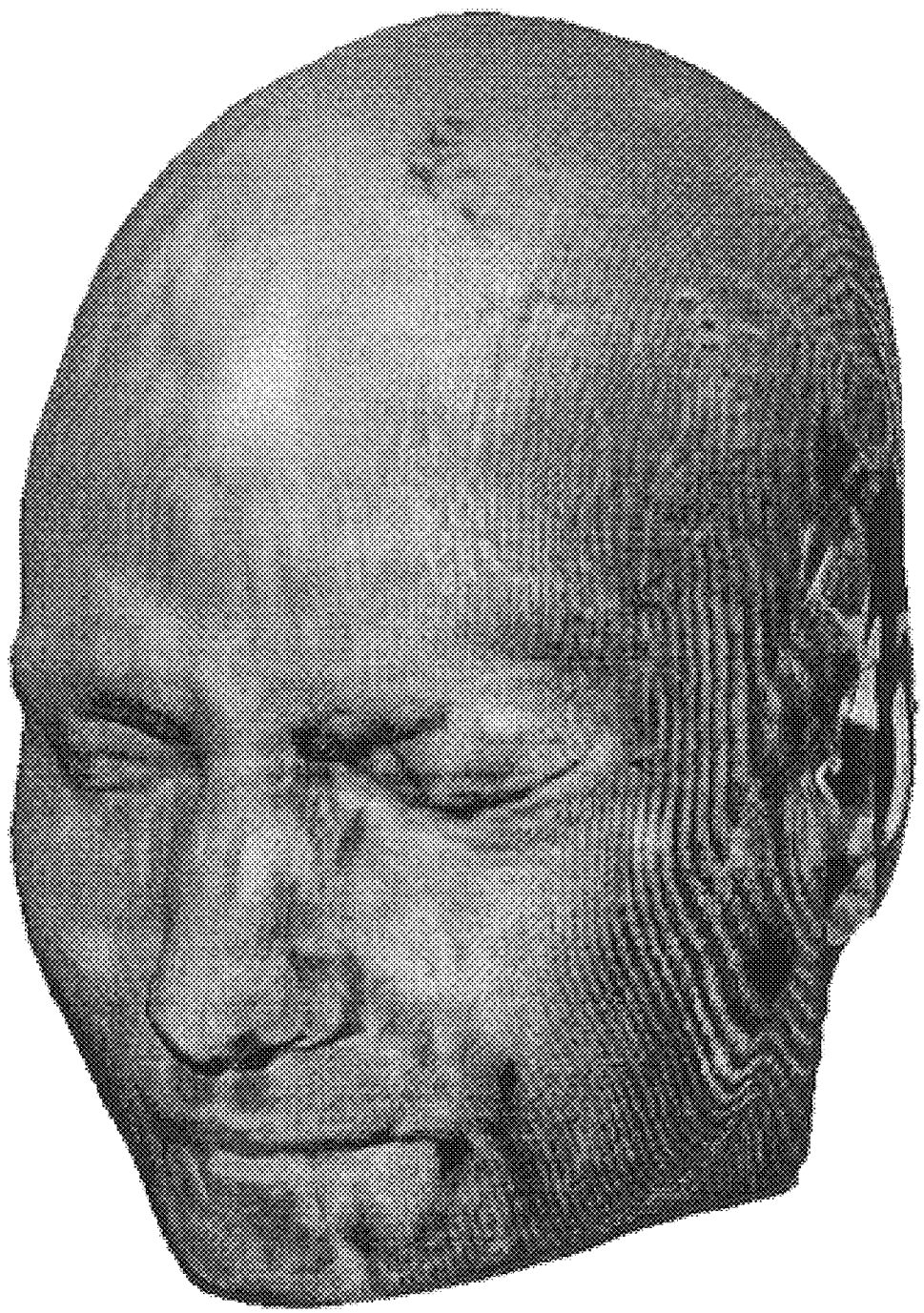
FIG. 6 is an example of a texture map obtained from a thin region around the skin.

FIG. 6 shows a sampling with a small depth close to the surface which shows the detail of the skin, wrinkles around the eyes, and mouth, from sampling a very thin layer of soft tissue around the segmented surface. The sampling starts at −3 pixels (that is three pixels outside of the surface) and covers a depth of 5 pixels towards the inside. In this rendering, the details around the eyes and the mouth can be seen.

Figure 7:
FIG. 7 is an example of a texture map obtained from skipping over the skin and sampling the brain.
Figure 8:
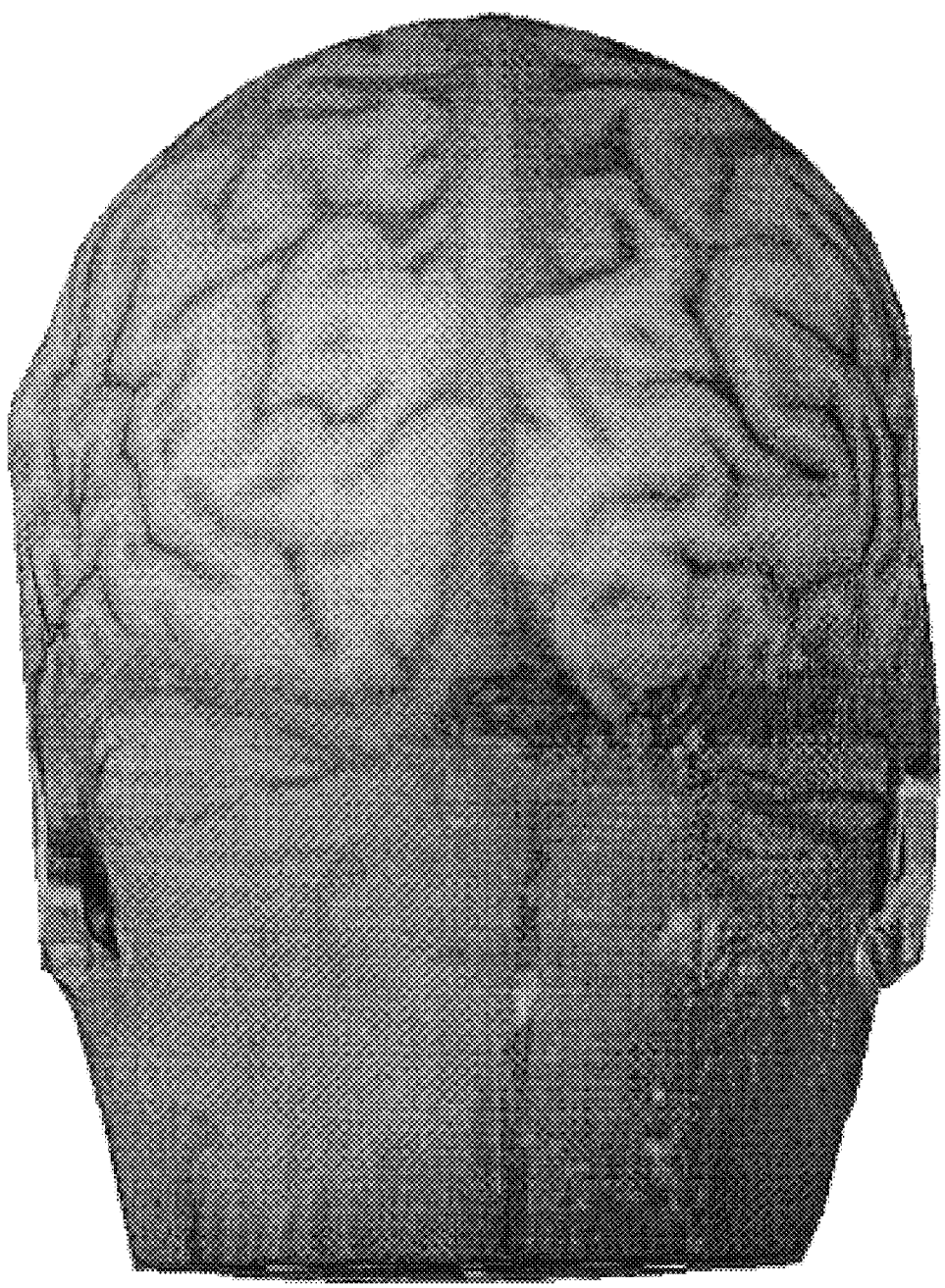
FIG. 8 is another example of the texture map of FIG. 7 from a different viewpoint.

The images of FIGS. 7 and 8 shows an example of sampling that skips the skin (about 8 pixels) and then samples a range of 14 pixels. As can be seen, the brain and blood vessels immediately beyond the surface are visible. This rendering can be used to display information of close by structures for use in conjunction with, for example, a needle biopsy.

Figure 9:
FIG. 9 is a texture map of the descending aorta as generated in accordance with an embodiment of the invention.

FIG. 9 shows a descending aorta with a stent (wire mesh) inside. This data was obtained from a Spiral CT (512×512× 80). Segmentation was done by region growing and morphological dilation.

This method can be employed to show organs that are intersected by a ray, like in radiation therapy. For example, you could use a model of the radiation beam, and sample the Ct-data along that surface.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method for volume rendering, comprising the steps of:
    selecting a region of interest (roi) to be rendered;
    generating a polyhedral model of a surface of the selected region of interest;
    calculating 2 dimensional texture maps for polygons comprising the polyhedral model,
    wherein the step of calculating comprises
        allocating a 2 dimensional texture image from an initial polygon generated by the polyhedral model;
        interpolating a normal at each vertex for the initial polygon;
        sampling a plurality of layers of parallel polygons at a predetermined depth along the interpolated normals; and
        converting the sampled data into a texture map; and
    rendering the calculated texture maps on the polyhedral model.

2. The method according to claim 1, wherein said step of rendering the texture maps further comprises the step of compositing of the calculated layers into the texture image.

3. The method according to claim 1, wherein said step of converting further comprises the steps of:
    resampling the data volume along the triangles; and
    composing a texture map from the plurality of layers of sampled triangles.

4. A method for volume rendering, comprising the steps of:
    selecting a region of interest (roi) to be rendered;
    generating a polyhedral model of a surface of the selected region of interest;
    calculating 2 dimensional texture maps for polygons comprising the polyhedral model,
    wherein the step of calculating comprises
        allocating a 2 dimensional texture image from an initial polygon generated by the polyhedral model;
        interpolating a normal at each vertex for the initial polygon;
        sampling a plurality of layers of parallel polygons at a predetermined depth along the interpolated normals; and
        converting the sampled data into a texture map; and
    rendering the calculated texture maps on the polyhedral model;
    wherein said step of generating a polyhedral model is based on a three-dimensional Delaunay triangulation process.

5. A method for volume rendering, comprising the steps of:
    selecting a region of interest (roi) to be rendered;
    generating a polyhedral model of a surface of the selected region of interest;
    calculating 2 dimensional texture maps for polygons comprising the polyhedral model,
    wherein the step of calculating comprises
        allocating a 2 dimensional texture image from an initial polygon generated by the polyhedral model;
        interpolating a normal at each vertex for the initial polygon;
        sampling a plurality of layers of parallel polygons at a predetermined depth along the interpolated normals; and
        converting the sampled data into a texture map; and
    rendering the calculated texture maps on the polyhedral model; wherein said step of converting further comprises the steps of:
        resampling the data volume along the polygons; and
        composing a texture map from the plurality of layers of sampled polygons; and wherein said step of composing can be performed using maximum intensity projection (MIP).

6. A method for volume rendering, comprising the steps of:
    selecting a region of interest (roi) to be rendered;
    generating a polyhedral model of a surface of the selected region of interest;
    calculating 2 dimensional texture maps for polygons comprising the polyhedral model,
    wherein the step of calculating comprises
        allocating a 2 dimensional texture image from an initial polygon generated by the polyhedral model;
        interpolating a normal at each vertex for the initial polygon;
        sampling a plurality of layers of parallel polygons at a predetermined depth along the interpolated normals; and
        converting the sampled data into a texture map; and
    rendering the calculated texture maps on the polyhedral model; wherein said step of converting further comprises the steps of:
        resampling the data volume along the polygons; and
        composing a texture map from the plurality of layers of sampled polygons; and wherein said step of composing can be performed using minimum intensity projection (MINIP).

7. A method for volume rendering, comprising the steps of:
    selecting a region of interest (roi) to be rendered;
    generating a polyhedral model of a surface of the selected region of interest;
    calculating 2 dimensional texture maps for polygons comprising the polyhedral model,
    wherein the step of calculating comprises
        allocating a 2 dimensional texture image from an initial polygon generated by the polyhedral model;
        interpolating a normal at each vertex for the initial polygon;
        sampling a plurality of layers of parallel polygons at a predetermined depth along the interpolated normals; and converting the sampled data into a texture map; and
rendering the calculated texture maps on the polyhedral model; wherein said step of converting further comprises the steps of:
  resampling the data volume along the polygons; and
  composing a texture map from the plurality of layers of sampled polygons; and wherein said step of composing can be performed by adding corresponding pixel intensity values of layers of sampled polygons.

8. A program storage device readable by a machine, tangibly embodying a program of instructions executable by the machine to perform method steps for volume rendering, the method comprising the steps of:
  selecting a region of interest (roi) to be rendered;
  generating a polyhedral model of a surface of the selected region of interest;
  calculating 2 dimensional texture maps for polygons comprising the polyhedral model,
  wherein the step of calculating comprises
    allocating a 2 dimensional texture image from an initial polygon generated by the polyhedral model;
    interpolating a normal at each vertex for the initial polygon;
    sampling a plurality of layers of parallel polygons at a predetermined depth along the interpolated normals; and
    converting the sampled data into a texture map; and
  rendering the calculated texture maps on the polyhedral model.

9. The program storage device of claim 8, wherein the instructions for selecting a region of interest comprise instructions for performing segmentation.

10. The program storage device of claim 8, wherein the instructions for generating a polyhedral model comprise instruction for performing a three-dimensional Delaunay triangulation process.

11. The program storage device of claim 8, wherein the instructions for converting the sampled data into a texture map comprise instruction for performing the steps of:
  resampling the volume data along the polygons; and
  composing a texture map from the plurality of layers of sampled polygons.

12. The program storage device of claim 11, wherein the instructions for performing the step of composing comprise instructions for performing a maximum intensity projection (MIP).

13. The program storage device of claim 11, wherein the instructions for performing the step of composing comprise instructions for performing a minimum intensity projection (MINIP).

14. The program storage device of claim 11, wherein the instructions for performing the step of composing comprise instruction for adding corresponding pixel intensity values of layers of sampled polygons.

15. A method for volume rendering using texture mapping, comprising the steps of:
  generating a polyhedral model of a surface of a region of interest, wherein the polyhedral model comprises a plurality of polygons;
  interpolating a normal for each vertex of at least one polygon of the polyhedral model;
  sampling texture data of parallel layers corresponding to the polygon within a specified distance from the surface using the interpolated normals; and
  rendering a texture map on the polyhedral model using the sampled texture data.

16. The method of claim 15, wherein the step of rendering comprises the steps of:
  resampling texture data of selected one of the parallel layers; and
  composing the texture map from the texture data of each selected parallel layer.

17. The method of claim 16, wherein the step of composing is performed using a maximum intensity projection (MIP).

18. The method of claim 16, wherein the step of composing is performed using a minimum intensity projection (MINIP).

19. The method of claim 16, wherein the step of composing is performed by adding corresponding pixel intensity values of each selected parallel layer.

20. A program storage device readable by a machine, tangibly embodying a program of instructions executable by the machine to perform method steps for volume rendering using texture mapping, the method comprising the steps of:
  generating a polyhedral model of a surface of a region of interest, wherein the polyhedral model comprises a plurality of polygons;
  interpolating a normal for each vertex of at least one polygon of the polyhedral model;
  sampling texture data of parallel layers corresponding to the polygon within a specified distance from the surface using the interpolated normals; and
  rendering a texture map on the polyhedral model using the sampled texture data.

* * * * *